United States Patent
Arocena et al.

(10) Patent No.: US 11,157,499 B2
(45) Date of Patent: Oct. 26, 2021

(54) REDUCING DATA ACCESS RESOURCES IN A SERVERLESS COMPUTING ENVIRONMENT USING CACHING

(71) Applicant: International Business Machines Corporation, Armonk, NY (US)

(72) Inventors: Gustavo Arocena, Toronto (CA); Adam J. Storm, Toronto (CA); Christian Garcia-Arellano, Richmond Hill (CA); Ronen Grosman, Thornhill (CA); Daniele Costante Zilio, Georgetown (CA)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 16/733,381

(22) Filed: Jan. 3, 2020

(65) Prior Publication Data
US 2021/0209107 A1 Jul. 8, 2021

(51) Int. Cl.
*G06F 16/2453* (2019.01)

(52) U.S. Cl.
CPC .. *G06F 16/24542* (2019.01); *G06F 16/24539* (2019.01)

(58) Field of Classification Search
None
See application file for complete search history.

(56) References Cited

U.S. PATENT DOCUMENTS

| 10,169,429 B2 | 1/2019 | Bourbonnais | |
|---|---|---|---|
| 2013/0166588 A1* | 6/2013 | Gruschko | G06F 16/00 707/769 |
| 2013/0304723 A1* | 11/2013 | Konik | G06F 16/24561 707/718 |
| 2017/0091269 A1* | 3/2017 | Zhu | G06F 16/24542 |
| 2017/0132293 A1 | 5/2017 | Bourbonnais | |
| 2017/0147686 A1* | 5/2017 | Chainani | G06F 16/335 |
| 2021/0035124 A1* | 2/2021 | Morton | G06F 16/23 |

FOREIGN PATENT DOCUMENTS

WO 20180495631 A1 3/2018

OTHER PUBLICATIONS

"Enable API Caching to Enhance Responsiveness", © 2019, Amazon Web Services, 5 pages, http://docs.aws.amazon.com/apigateway/latest/developerguide/api-gateway-caching.html.
"Serverless Performance and Optimization Strategies", A BJSS White Paper, © 2018 IEEE, 16 pages.
Duong et al., "Score: A Score-Based Memory Cache Replacement Policy", HAL archives-ouvertes.fr, Submitted on Jun. 17, 2010, 5 pages.

(Continued)

*Primary Examiner* — Christopher J Raab
(74) *Attorney, Agent, or Firm* — Stephen R. Yoder

(57) ABSTRACT

Reducing data access resources by creating a scoring mechanism for computing a running score for data objects in a database having an associated score value in order to determine whether or not a set of data object(s) should remain in a caching gateway or whether or not the set of data object(s) should be removed from the caching gateway.

20 Claims, 4 Drawing Sheets

(56) References Cited

OTHER PUBLICATIONS

Elghandour et al., "An XML Index Advisor for DB2", SIGMOD'08, Jun. 9-12, 2008, Vancouver, BC, Canada, ACM 978-1-60558-102-6/08/06, 4 pages.

Tanzil et al., "Adaptive Scheme for Caching YouTube Content in a Cellular Network: Machine Learning Approach", IEEE Access, Special Section on Wireless Caching Technique for 5G, accepted Feb. 23, 2017, date of publication Mar. 7, 2017, date of current version May 17, 2017, 12 pages, <http://ieeexplore.ieee.org/stamp/stamp.jsp?arnumber=7873292>.

Valentin et al., "DB2 Advisor: An Optimizer Smart Enough to Recommend Its Own Indexes", printed on Jul. 15, 2019, 10 pages.

Yang et al., "Intermediate Data Caching Optimization for Multi-Stage and Parallel Big Data Frameworks", arXiv:1804.10563vs [cs.PF] May 7, 2018, 10 pages.

Zilio et al., "Recommending Materialized Views and Indexes with the IBM DB2 Design Advisor", Proceedings of the International Conference on Automatic Computing (ICAC'04), CS848—Spring 2005, 24 pages.

\* cited by examiner

REDUCING DATA ACCESS RESOURCES IN A SERVERLESS COMPUTING ENVIRONMENT USING CACHING

BACKGROUND

The present invention relates generally to the field of serverless computing and/or a compute-storage separated environment, and more particularly to data access resources in the serverless computing and/or compute-storage separated environment.

The concept of "serverless computing" is known. As of Nov. 6, 2019, the Wikipedia entry for "serverless computing" states as follows: "Serverless computing is a cloud-computing execution model in which the cloud provider runs the server, and dynamically manages the allocation of machine resources. Pricing is based on the actual amount of resources consumed by an application, rather than on pre-purchased units of capacity. It can be a form of utility computing. Serverless computing can simplify the process of deploying code into production. Scaling, capacity planning and maintenance operations may be hidden from the developer or operator. Serverless code can be used in conjunction with code deployed in traditional styles, such as microservices. Alternatively, applications can be written to be purely serverless and no use no provisioned servers at all. This should not be confused with computing or networking models that do not require an actual server to function, like peer-to-peer (P2P)."

The concept of "cache" is known. As of Nov. 6, 2019, the Wikipedia entry for "cache" states as follows: "A cache is a hardware or software component that stores data so that future requests for that data can be served faster . . . the data stored in a cache might be the result of an earlier computation or a copy of data stored elsewhere . . . . To be cost-effective and to enable efficient use of data, caches must be relatively small. Nevertheless, caches have proven themselves in many areas of computing, because typical computer applications access data with a high degree of locality of reference."

SUMMARY

According to an aspect of the present invention, there is a method, computer program product and/or system that performs the following operations (not necessarily in the following order): (i) receiving, from a user, a first query, with the first query including information indicative of a number of data objects defined for use with the first query and a score value associated with each data object defined for use with the first query; (ii) assigning a first score value to the first query based, at least in part, upon a summation of the score value(s) associated with each data object that is defined for use with the first query; (iii) storing the first query to a first cache based upon the first score value assigned to the first query; (iv) receiving, from a user, a second query, with the second query including information indicative of a number of data objects defined for use with the second query and a score value associated with each data object defined for use with the second query; and (v) assigning a second score value to the second query based, at least in part, upon a summation of the score value(s) associated with each data object that is defined for use with the second query.

According to an aspect of the present invention, there is a method, computer program product and/or system that performs the following operations (not necessarily in the following order): (i) receiving, from a user, a first query, with the first query including information indicative of a number of data objects defined for use with the first query and a score value associated with each data object defined for use with the first query; (ii) assigning a first score value to the first query based, at least in part, upon a summation of the score value(s) associated with each data object that is defined for use with the first query; (iii) storing the first query to a first cache based upon the first score value assigned to the first query; (iv) responsive to the storage of the first query to the first cache, maintaining a running score based upon the first score value assigned to the first query; (v) receiving, from a user, a second query, with the second query including information indicative of a number of data objects defined for use with the second query and a score value associated with each data object defined for use with the second query; (vi) assigning a second score value to the second query based, at least in part, upon a summation of the score value(s) associated with each data object that is defined for use with the second query; (vii) performing a first recalculation of the running score by summing the first score value and the second score value; and (viii) responsive to the performance of the first recalculation of the running score, determining a cache workload function based, at least in part, upon the first recalculation of the running score, with the cache workload function being used to generate a multi-tier data access service based, at least in part, upon the indication of the query performance.

According to an aspect of the present invention, there is a method, computer program product and/or system that performs the following operations (not necessarily in the following order): (i) receiving, by a caching gateway, a first query, with the first query including information indicative of a plurality of data objects, and with each data object of the plurality of data objects having an associated score value; (ii) updating, by the caching gateway, a running score based upon a summed value of the associated score value(s) of each of the data objects to obtain a first running score value; (iii) determining that a first query execution plan is to be used based upon the comparison of: (a) the efficiency of the first query execution plan that runs a first workload on a storage backend, and (b) the efficiency of a second query execution plan that uses a combination of cached data and secondary objects stored in the storage backend; (iv) receiving, by the caching gateway, a second query, with the second query including information indicative of a plurality of data objects, and with each data object of the plurality of data objects having an associated score value; (v) responsive to the determination that the first query execution plan is to be used and the receipt of the second query, using the first query execution plan to store the second query in the storage backend; (vi) updating, by the caching gateway, the first running score value by summing the first running score value with the associate score value(s) of each of the data objects from the second query to obtain a second running score value; (vii) determining, by a cache eviction module, that at least a portion of the data objects associated with the first query should be removed from the storage backend based, at least in part, upon the second running score value; and (viii) responsive to the determination that at least the portion of data objects associated with the first query should be removed, removing the portion of data objects associated with the first query from the storage backend.

According to an aspect of the present invention, there is a method, computer program product and/or system that performs the following operations (not necessarily in the following order): (i) receiving, by a caching gateway, a first data set, with the first data set including: (a) a first plurality of queries, with each query of the first plurality of queries including data objects, with the data objects having an associated score value, and (b) metadata associated with the data objects; (ii) receiving, by the caching gateway, a first set of secondary data objects, with the first set of secondary data objects having an associated score value and metadata; (iii) responsive to the receipt of a first query of the first plurality of queries, evaluating, by the caching gateway, a plurality of query execution plans; (iv) responsive to the evaluation of the plurality of query execution plans, selecting, by the caching gateway, the query execution plan deemed to be most beneficial; (v) executing, by the caching gateway, the selected query execution plan; and (vi) maintaining, by the caching gateway, the data objects of the first plurality of queries and the secondary data objects.

According to an aspect of the present invention, there is a method, computer program product and/or system that performs the following operations (not necessarily in the following order): (i) receiving, by a caching gateway, a first data set, with the first data set including: (a) a first plurality of queries, (b) a first set of base data objects from a storage backend not currently present in the caching gateway, with each given data object(s) of the first set of base data objects having an associated metadata but no score value, (c) a second set of data objects already present in the caching gateway, with each given data object(s) of the second set of data objects having an associated metadata and associated score value, and (d) a third set of data objects only present in the caching gateway as metadata, with each given data object(s) of the third set of data objects having an associated score value; (ii) responsive to the receipt of a first query of the first plurality of queries, evaluating, by the caching gateway, a plurality of query execution plans using a combination of the first, second and third set of data objects; (iii) responsive to the evaluation of the plurality of query execution plans, selecting, by the caching gateway, the query execution plan deemed to be most beneficial; (iv) executing, by the caching gateway, the selected query execution plan; and (v) maintaining, by the caching gateway, the data objects of the first plurality of queries.

DETAILED DESCRIPTION

Figure 1:
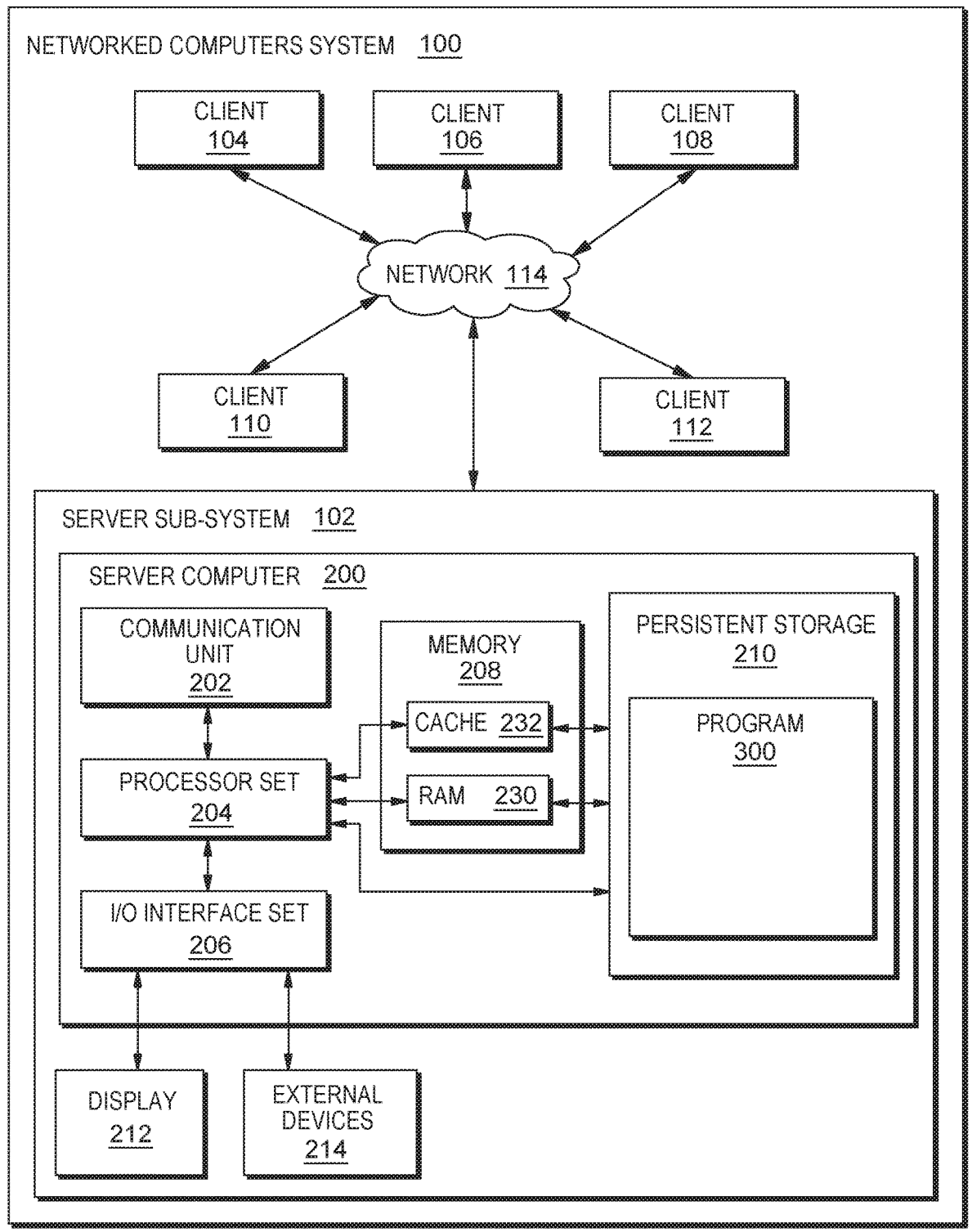
FIG. 1 is a block diagram view of a first embodiment of a system according to the present invention.

Some embodiments of the present invention are directed to reducing data access resources for a set of users by creating a scoring mechanism for computing a running score for data objects in a database in order to determine whether or not a set of data object(s) should remain in a caching gateway or whether or not the set of data object(s) should be removed from the caching gateway.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semi-conductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention and described in detail with reference to the Figures. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
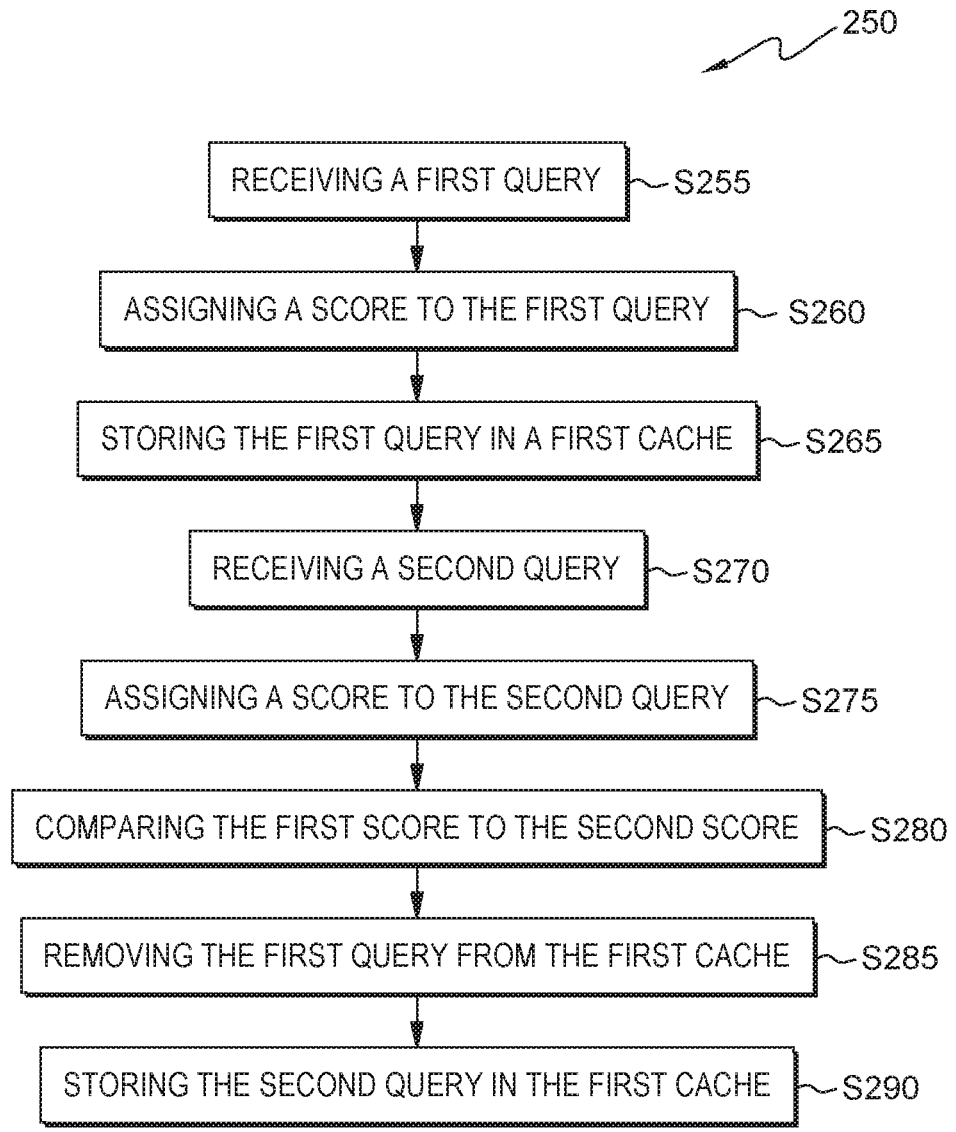
FIG. 2 is a flowchart showing a first embodiment method performed, at least in part, by the first embodiment system.
Figure 3:
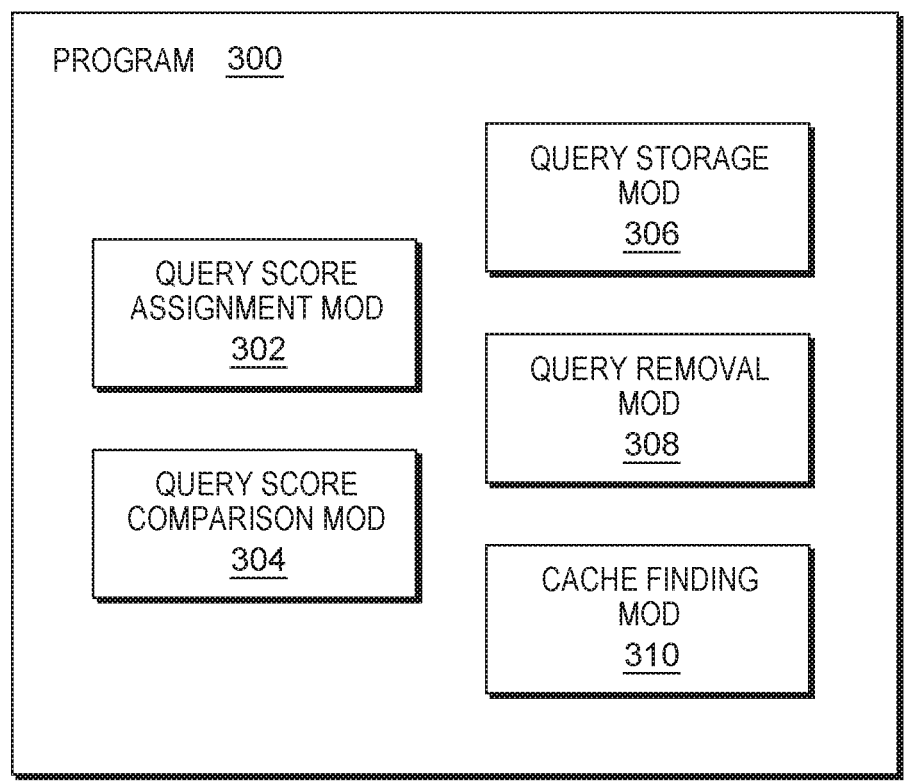
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where a first query is received from a user, typically from a client device such as client 104, and through network 114. The first query contains several pieces of information, including, in pertinent part, query size and data objects that define the query (such as indexes and summary tables), and metadata associated with the first query (such as the number of times the first query has been stored in cache 232, the number of times the query has been recalled from cache 232, and the number of times the first query has been re-assigned to a different tier within cache 232).

Processing proceeds to operation S260, where query score assignment mod 302 assigns a score value to the first query. This score value is a numerical score value that is used to determine: (i) whether it is permissible or advisable to continue to store the first query in cache; (ii) whether it is permissible or advisable to remove the first query from the cache; and/or (iii) whether it is permissible or advisable to re-assign the first query from the cache to a different tier of cache). Additionally, each object type that defines the first query has a pre-defined score that is associated with the object type. For example, an index may have a score of three (3) whereas a summary table may have a score of two (2).

Query score assignment mod 302 assigns the score value to the first query by: (i) determining the number of data objects that define the first query; (ii) determining the score value associated with each data object that defines the first query; and (iii) sums up the score values to obtain a first score value that for the first query.

Processing proceeds to operation S265, where query storage mod 306 stores the first query into cache, such as cache 232 (as shown in FIG. 1). Processing proceeds to operation S270, where a second query is received from a user, typically from a client device such as client 106, and through network 114. The second query contains several pieces of information, including, in pertinent part, query size and data objects that define the query (such as indexes and summary tables), and metadata associated with the first query (such as the number of times the first query has been stored in cache 232, the number of times the query has been recalled from cache 232, and the number of times the second query has been re-assigned to a different tier of cache.

Processing proceeds to operation S275, where query score assignment mod 302 assigns a score value to the second query. Query score assignment mod 302 assigns the score value to the second query to obtain a second score value in the same manner as described above in connection with assigning a score value to the first query in operation S260.

Processing proceeds to operation S280, where query score comparison mod 304 compares the first score value to the second score value. In one example, query score comparison mod 304 compares the first score value to the second score value and determines that the second score value is lower than the first score value. In effect, the results of this determination means, in this example, that the first query should be removed from cache 232 and replaced with the second query because the second query utilizes less cache than the first query.

Processing proceeds to operation S285, where query removal mod 308 removes the first query from cache 232 so that the second query can be stored. Processing finally proceeds to operation S290, where query storage mod 306 stores the second query in cache 232 so that cache 232 is more efficiently utilized.

Figure 4:
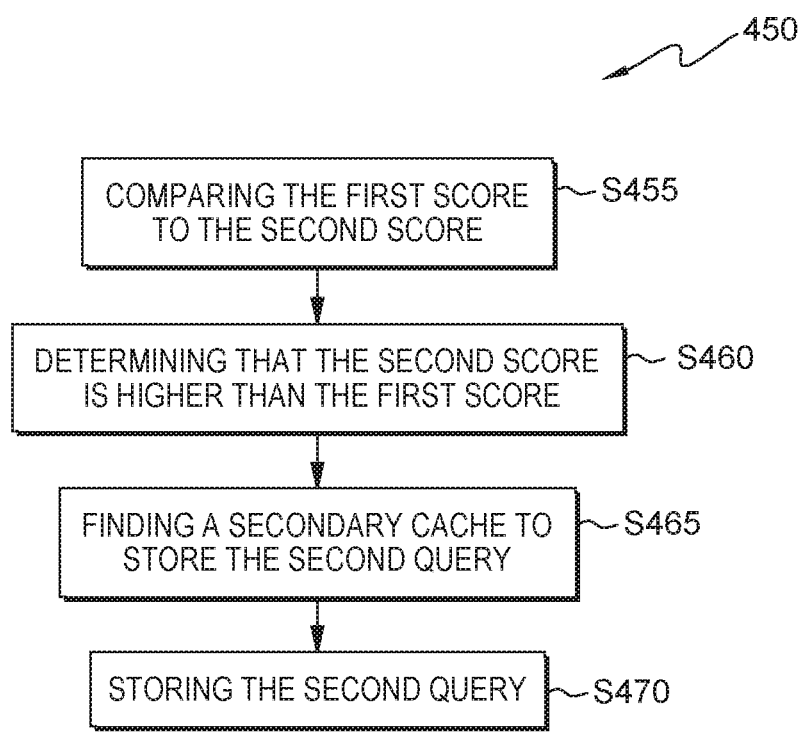
FIG. 4 is a flowchart showing a second embodiment method performed, at least in part, by the first embodiment system.

As shown in FIG. 4, flowchart 450 shows an example method according to the present invention. This method and associated software will now be discussed, over the course the following paragraphs, with extensive reference to the blocks of FIGS. 1, 3 and 4. The operations of flowchart 450 illustrate an alternative embodiment of the present invention where the second score value is higher than the first score value. It is assumed that, for the purposes of this discussion, the precursor operations that would logically fit into flowchart 450 come from the operations of flowchart 250.

Processing begins at operations S455 and S460, where query score comparison mod 304 compares the first score value to the second score value. In one example, query score comparison mod 304 compares the first score value to the second score value and determines that the second score value is higher than the first score value. In effect, the results of this determination means, in this example, that the first query should remain in cache 232 because it utilizes less cache than the second query.

Processing proceeds to operation S465, where cache finding mod 310 finds a secondary cache (either within cache 232 or a separate cache (not shown)) to store the second query. This secondary cache is sometimes referred to as a second "tier" of cache. Effectively, cache finding mod 310 locates a secondary cache (that is, a separate logical location in which to store a query that meets certain criteria). Upon finding the secondary cache in which to store the second query, processing proceeds to operation S470 where the second query is stored in the found secondary cache.

III. Further Comments and/or Embodiments

Some embodiments of the present invention recognize the following facts, potential problems and/or potential areas for improvement with respect to the current state of the art: (i) the use of server-less environments and the separation of compute and storage can bring significant savings for big data environments; (ii) in a database system, caching query results (such as MQTs), synopsis tables, and indexing are common techniques for reducing the cost of accessing the full data set; (iii) with the separation of compute and storage, the caching can occur on the compute nodes, thereby losing the caching once the compute environment is terminated or down in the storage layer, which incurs additional storage costs; (iv) in a serverless environment, the caching can be done in the API (Application Program Interface) gateway; (iv) caching can be done for specific responses to API requests for a given amount of time in order to reduce the number of calls made to the endpoint and also improve the latency of the requests to the API; (v) an intermediate caching layer exists in caching online videos in a cellular network to reduce network utilization and improves user experience; (vi) the main challenge exists in predicting the future popularity of a given set of media content; (vii) to resolve this challenge, a machine learning neural network module is used to estimate the popularity of content; and/or (viii) there are mechanisms to identify the indexes and summary tables that would provide the most benefit for a given database workload based on the query frequency and common access patterns.

Some embodiments of the present invention may include one, or more, of the following operations, features, characteristics and/or advantages: (i) solves the problem of improving the structured data query performance of serverless environments or environments with separate compute and storage by implementing a caching gateway that can be placed in front of one or more storage backends; (ii) the caching gateway uses a scoring mechanism that, given an amount of cache utilization to use by a query or set of queries, the scoring mechanism can compute the improved query performance; (iii) using the scoring mechanism to determine which objects should be kept in the cache; and/or (iv) uses the scoring mechanism for managing a caching gateway.

According to one embodiment of the present invention, there is a method for implementing a caching gateway for structured data to reduce the cost to the more expensive access to the complete data set in the main data source when utilizing serverless environments (or environments with separate compute and storage). According to this method, the caching gateway provides a scoring mechanism that given an amount of cache utilization to use by a query or set of queries. By using this scoring mechanism, embodiments of the present invention can compute the improved query performance.

In some embodiments of the present invention, a scoring mechanism is used to determine which elements should be kept in the cache. Currently, there are many existing mechanisms that allow the user to get recommendations on which indexes or summary tables to define for a given query or set of queries to improve query performance (such as those implemented by the Db2 (Database 2) design advisor). Additionally, these mechanisms allow the user to include space constraints in the recommendations. Embodiments of the present invention, however, apply the same techniques to in order to get recommendations for materializing these secondary objects in the cache. In this example, secondary objects include: (i) horizontal or vertical subsets of the tables; (ii) subset of partitions and/or shards of a table; (iii) summary tables; (iv) complete or partial indexes.

In order to get recommendations for materializing the secondary objects in cache, embodiments of the present invention utilize the above-mentioned techniques by taking into account the following three options: (i) the potential query execution plans and cost if they were run only in the storage backend with the existing indexes, summary tables and cached data; (ii) the potential query execution plans and cost if they were used with a combination of subsets of the cached data and secondary objects in the caching gateway together with those in the storage backend; and (iii) allows the caching of data or on-the-fly creation of secondary structures in the caching gateway to allow serving future queries in a more efficient manner.

In some embodiments of the present invention, each object that is materialized in the caching gateway maintains a running score that is continuously updated as the object is either utilized or as the object becomes a candidate to be utilized by new queries. This scoring mechanism of the objects in the cache as well as other objects to add to the cache is continuously evaluated to be used as input for a cache eviction algorithm (that is, the scoring mechanism for these objects continuously used to determine whether the object in question needs to remain in the cache).

In some embodiments, this scoring mechanism can be applied to a workload to return a function of the varying amount of cache space used and resulting improved query performance. Alternatively, in some embodiments, this scoring mechanism can also be used to identify the additional performance benefit for a specific query given the current contents of the cache versus the direct access to the backend. It is important to note that the query language of the caching gateway is a subset of the query language of the storage backend to allow for applying these caching techniques more easily.

Additionally, these caching techniques will be more effective if the data maintained in the backend is immutable. If the data maintained in the backend is not immutable, any of the cached data may be subject to being invalidated and/or re-cached when modified in the backend. This would reduce the effectiveness of the caching, and could be applied effectively for subsets of the dataset that are not frequently updated.

Additionally, these same caching techniques could be applied on the backend caching if the backend were composed by multiple nodes that could selectively have access to or do caching of portions of the dataset and secondary objects. In this scenario, the caching gateway could also retrieve the score from each backend node for its potential query execution plan and cost for a query or set of queries, and include this in the evaluation of the most efficient access plan. This could also allow an architecture of multiple levels of caching gateways, for example, across multiple geographies.

In some embodiments, the caching gateway and its scoring mechanism can be used to provide the user with a multi-tier service that serves a varying percentage of the query executions from the cache with a clear metric of the benefit that the user will get from using the cache. This implementation requires the use of the scoring mechanism to: (i) analyze the workload, (ii) identify potential for caching query results or create secondary objects to be stored within the caching gateway, and (iii) compute the overall workload benefit as a function of the space used in order to provide the user with the multi-tier service.

Alternatively, in some embodiments, an "on-the-fly" identification of queries that could have benefited from the use of the cache can be used. This "on-the-fly" identification can be used as a mechanism to provide the user with a higher tier of service. For example, the user can be provided a new monitoring Application Program Interface (API) to retrieve the cache utilization for a given query in the caching gateway. Within the caching gateway, the user can access information such as the latency reduction for various additional cache space utilization tiers and an associated cost for each of these tiers given the observed frequency of the given query. In another example, the user would be to allowed to run the given query in a simulated mode in which the user can input how much of the cache the user should be allowed to use, and determine the cost of the given query based on the input. Alternatively, a service provider can use this caching mechanism and the same cost/benefit analysis described above to reduce its own costs.

In one embodiment of the present invention, there is a method for reducing data access resources in a computing environment. The method includes at least the following operations (not necessarily performed in the following order): (i) executing a scoring mechanism to determine which elements, including indexes and summary tables to define for a given query and set of queries, to keep in a cache as a set of recommendations for materializing secondary objects including horizontal subsets or vertical subsets of tables, a subset of partitions/shards of a table, summary tables, and complete indexes or partial indexes, by: (a) analyzing potential query execution plans and associated cost when running only in a storage backend with existing indexes, summary tables and cached data, (b) analyzing the potential query execution plans and associated cost when using a combination of subsets of cached data and the secondary objects in a caching gateway together with the secondary objects in the storage backend, and (c) enabling caching of data and on-the-fly creation of secondary structures in the caching gateway to serve future queries; (ii) maintaining, by each object materialized in the caching gateway, a respective running score continuously updated when the object is at least one of utilized and a candidate to be utilized by new queries; (iii) continuously evaluating the scoring of the objects in the cache and potential other objects to add to the cache to generate input for a cache eviction algorithm by: (a) executing the scoring mechanism to a workload to return a function of a varying amount of cache space used and a resulting improved query performance, (b) executing the scoring mechanism to identify an additional performance benefit for a specific query given current contents of the cache versus a direct access to the storage backend, and (c) executing the scoring mechanism to at least one of analyze the workload, identify potential for caching query results and create secondary objects to be stored within the caching gateway; (iv) computing an overall workload benefit as a function of space used; and/or (iv) generating multiple tiers of data access service according to the workload benefit.

In one embodiment of the present invention, there is a method including the following operations (not necessarily in the following order): (i) receiving, from a user, a first query, with the first query including information indicative of a number of data objects defined for use with the first query and a score value associated with each data object defined for use with the first query; (ii) assigning a first score value to the first query based, at least in part, upon a summation of the score value(s) associated with each data object that is defined for use with the first query; (iii) storing the first query to a first cache based upon the first score value assigned to the first query; (iv) responsive to the storage of the first query to the first cache, maintaining a running score based upon the first score value assigned to the first query; (v) receiving, from a user, a second query, with the second query including information indicative of a number of data objects defined for use with the second query and a score value associated with each data object defined for use with the second query; (vi) assigning a second score value to the second query based, at least in part, upon a summation of the score value(s) associated with each data object that is defined for use with the second query; (vii) performing a first recalculation of the running score by summing the first score value and the second score value; and/or (viii) responsive to the performance of the first recalculation of the running score, determining a cache workload function based, at least in part, upon the first recalculation of the running score, with the cache workload function being used to generate a multi-tier data access service based, at least in part, upon the indication of the query performance.

In one embodiment of the present invention, there is a method including the following operations (not necessarily in the following order): (i) generating a multi-tier data access service by a cache workload function to determine available cache for query storage; (ii) receiving, from a user, a third query, with the third query including information indicative of a number of data objects defined for use with the third query and a score value associated with each data object defined for use with the third query; (iii) assigning a third score value to the third query based, at least in part, upon a summation of the score value(s) associated with each data object that is defined for use with the third query; (iv) performing a second recalculation of the of the running score by summing the first score value, the second score value, and the third score value; (v) responsive to the performance of the second recalculation of the running score, determining that the third query can be stored in a first tier of cache based, at least in part, upon the cache workload function; and/or (vi) storing the third query in the first tier of cache.

In one embodiment of the present invention, there is a method including the following operations (not necessarily in the following order): (i) receiving, from a user, a fourth query, with the fourth query including information indicative of a number of data objects defined for use with the fourth query and a score value associated with each data object defined for use with the fourth query; (ii) assigning a fourth score value to the fourth query based, at least in part, upon a summation of the score value(s) associated with each data object that is defined for use with the third query; (iii) performing a third recalculation of the of the running score by summing the first score value, the second score value, the third score value, and the fourth score value; (iv) responsive to the performance of the third recalculation of the running score, determining that the fourth query cannot be stored in the first tier of cache based, at least in part, upon the cache workload function; and/or (v) storing the fourth query in a second tier of cache.

Some embodiments of the present invention may include one, or more, of the following operations, features, characteristics and/or advantages: (i) initially, the caching gateway does not contain any secondary objects; (ii) secondary objects are added to (and removed from) the caching gateway as queries are processed; (iii) secondary objects in the cache of the caching gateway have a score value that is used to determine whether or not the secondary object(s) can stay in the cache or be evicted from the cache; and/or (iv) the cache in the caching gateway contains metadata for objects that could have potentially be added to the cache, or that were previously in the cache, both with their corresponding score value.

In some embodiments of the present invention, when a query is received, the caching gateway evaluates multiple query execution plans. In some embodiments, each query execution plan that is received includes a combination of the following: (i) objects in the storage backend; (ii) secondary objects that have already materialized in the caching gateway; (iii) secondary objects that have not yet been materialized, but its metadata is already registered within the caching gateway and has an associated score value, and there is enough empty space that can be created to materialize the secondary objects. The creation of this empty space includes a combination of cache space that was unused and cache space that is freed by evicting secondary objects whose scores are lower than the secondary objects chosen to be materialized for this query.

Some embodiments of the present invention may include one, or more, of the following operations, features, characteristics and/or advantages: (i) from all of the evaluated query execution plans, the caching gateway chooses the one it considers to be the most beneficial; (ii) if the chosen query execution plan includes secondary objects that have not been yet materialized in the caching gateway, those secondary objects are flagged to be materialized as part of the execution of the plan for the currently chosen query; (iii) this flagging can result in the eviction of the data from the caching gateway for the existing materialized secondary objects that have a lower score value than the score value for the newly materialized secondary objects; (iv) the metadata for the evicted secondary objects remains in the cache; and/or (v) the chosen execution plan is then executed.

In some embodiments of the present invention, in addition to executing the query, the caching gateway performs cache maintenance operations. These cache maintenance operations include: (i) increments the scores of all secondary objects used in the chosen execution plan; and/or (ii) evaluates other potential query execution plans involving combinations of the objects it considered before and new secondary objects that do not yet exist in the caching gateway. In some embodiments, if any of these potential query execution plans is more beneficial than the chosen query execution plan, then the metadata for the new secondary objects is registered with the caching gateway with an initial score. Periodically, and independently of the query processing described above, the caching gateway decreases the score of secondary objects that have not been referenced within a certain amount of time. When the score of secondary object reaches a certain threshold, its data and metadata are automatically evicted from the cache.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style compute and rs, application-specific integrated circuit (ASIC) based devices.

What is claimed is:

1. A computer-implemented method (CIM) comprising:
receiving, by a caching gateway, a first data set, with the first data set including: (i) a first plurality of queries, (ii) a first set of base data objects from a storage backend not currently present in the caching gateway, with each given data object(s) of the first set of base data objects having an associated metadata but no score value, (iii) a second set of data objects already present in the caching gateway, with each given data object(s) of the second set of data objects having an associated metadata and associated score value, and (iv) a third set of data objects only present in the caching gateway as metadata, with each given data object(s) of the third set of data objects having an associated score value;
responsive to the receipt of a first query of the first plurality of queries, evaluating, by the caching gateway, a plurality of query execution plans using a combination of the first, second and third set of data objects;
responsive to the evaluation of the plurality of query execution plans, selecting, by the caching gateway, a first query execution plan deemed to be most beneficial to obtain the first selected query execution plan;
executing, by the caching gateway, the first selected query execution plan; and
maintaining, by the caching gateway, the data objects of the first plurality of queries.

2. The CIM of claim 1 wherein the maintenance of the data objects of the first plurality of queries and the second set of data objects includes incrementing the score values associated with the second and third sets of data objects that are used by the first selected query execution plan.

3. The CIM of claim 1 wherein the maintenance of the data objects of the first plurality of queries and the second set of data objects further includes:
determining, by the caching gateway, that the data objects exceed a size threshold of the caching gateway;
responsive to the determination, selecting a first sub-set of data objects in the caching gateway to obtain a selected sub-set of data objects, with each data objects of the selected sub-set of data objects having a lower score;
evicting, by the caching gateway, the selected sub-set of data objects; and
adding new data objects to the caching gateway.

4. The CIM of claim 1 further comprising:
determining, by the caching gateway, that a sub-set of the second and third set of data objects have not been referenced in a pre-defined period of time;
responsive to the determination, decreasing, by the caching gateway, the associated score value of the sub-set of the second and third set of secondary objects; and
evicting, by the caching gateway, the sub-set of the second and third set of secondary objects that have not been referenced in the pre-defined period of time.

5. The CIM of claim 1 wherein the caching gateway evaluates a second plurality of query execution plans.

6. The CIM of claim 5 wherein the evaluation of the second plurality of query execution plans includes a combination of the first set of data objects, the second set of secondary data objects, the third set of secondary data objects, and a fourth set of data objects not currently present in the caching gateway, with the data objects having an associated metadata.

7. The CIM of claim 6 wherein each given data object of the fourth set of data objects has an associated score value and metadata.

8. The CIM of claim 6 wherein the maintenance of the fourth set of data objects includes incrementing the score values associated with the fourth set of objects that are used by the selected query execution plan.

9. The CIM of claim 6 wherein the metadata and associated score of the fourth set of objects that are used by the selected query execution plan are added to the caching gateway for future consideration.

10. The CIM of claim 1 further comprising:
selecting, by the caching gateway, a second query execution plan using the first and the third set of data objects to obtain a second selected query execution plan, with the second selected query execution plan being a plan that is more efficient than the first selected query execution plan;
executing, by the caching gateway, the second selected query execution plan; and
responsive to the execution of the second selected query execution plan, maintaining, by the caching gateway, the first and third set of data objects.

11. A computer program product (CPP) comprising:
a non-transitory machine readable storage device; and
computer code stored on the non-transitory machine readable storage device, with the computer code including instructions and data for causing a processor(s) set to perform operations including the following:
receiving, by a caching gateway, a first data set, with the first data set including: (i) a first plurality of queries, (ii) a first set of base data objects from a storage backend not currently present in the caching gateway, with each given data object(s) of the first set of base data objects having an associated metadata but no score value, (iii) a second set of data objects already present in the caching gateway, with each given data object(s) of the second set of data objects having an associated metadata and associated score value, and (iv) a third set of data objects only present in the caching gateway as metadata, with each given data object(s) of the third set of data objects having an associated score value,
responsive to the receipt of a first query of the first plurality of queries, evaluating, by the caching gateway, a plurality of query execution plans using a combination of the first, second and third set of data objects,
responsive to the evaluation of the plurality of query execution plans, selecting, by the caching gateway, a first query execution plan deemed to be most beneficial to obtain a first selected query execution plan,
executing, by the caching gateway, the first selected query execution plan, and
maintaining, by the caching gateway, the data objects of the first plurality of queries.

12. The CPP of claim 11 wherein the maintenance of the data objects of the first plurality of queries and the second set of data objects includes incrementing the score values associated with the second and third sets of data objects that are used by the first selected query execution plan.

13. The CPP of claim 11 wherein the maintenance of the data objects of the first plurality of queries and the second set of data objects further includes:

determining, by the caching gateway, that the data objects exceed a size threshold of the caching gateway;

responsive to the determination, selecting a first sub-set of data objects in the caching gateway to obtain a selected sub-set of data objects, with each data objects of the selected sub-set of data objects having a lower score;

evicting, by the caching gateway, the selected sub-set of data objects; and adding new data objects to the caching gateway.

14. The CPP of claim 11 further comprising:

determining, by the caching gateway, that a sub-set of the second and third set of data objects have not been referenced in a pre-defined period of time;

responsive to the determination, decreasing, by the caching gateway, the associated score value of the sub-set of the second and third set of secondary objects; and evicting, by the caching gateway, the sub-set of the second and third set of secondary objects that have not been referenced in the pre-defined period of time.

15. The CPP of claim 11 wherein the caching gateway evaluates a second plurality of query execution plans.

16. The CPP of claim 15 wherein the evaluation of the second plurality of query execution plans includes a combination of the first set of data objects, the second set of secondary data objects, the third set of secondary data objects, and a fourth set of data objects not currently present in the caching gateway, with the data objects having an associated metadata.

17. The CPP of claim 16 wherein each given data object of the fourth set of data objects has an associated score value and metadata.

18. The CPP of claim 16 wherein:

the maintenance of the fourth set of data objects includes incrementing the score values associated with the fourth set of objects that are used by the selected query execution plan; and the metadata and associated score of the fourth set of objects that are used by the selected query execution plan are added to the caching gateway for future consideration.

19. The CPP of claim 11 further comprising:

selecting, by the caching gateway, a second query execution plan using the first and the third set of data objects to obtain a second selected query execution plan, with the second selected query execution plan being a plan that is more efficient than the first selected query execution plan;

executing, by the caching gateway, the second selected query execution plan; and responsive to the execution of the second selected query execution plan, maintaining, by the caching gateway, the first and third set of data objects.

20. The CPP of claim 11 further comprising:

the processor(s) set;

wherein the computer program product is in the form of a computer system.

* * * * *